Nov. 23, 1926.

A. L. R. ELLIS 1,608,311

OSCILLATOR

Filed Jan. 5, 1926

Inventor:
Alvarado L.R.Ellis,
by
His Attorney.

Patented Nov. 23, 1926.

1,608,311

UNITED STATES PATENT OFFICE.

ALVARADO L. R. ELLIS, OF SWAMPSCOTT, MASSACHUSETTS, ASSIGNOR TO GENERAL ELECTRIC COMPANY, A CORPORATION OF NEW YORK.

OSCILLATOR.

Application filed January 5, 1926. Serial No. 79,450.

My invention relates to apparatus comprising a piezo electric element, and has for its principal object the provision of a method and means whereby oscillation of the piezo electric element may be readily started.

It is well known that an oscillating piezo electric element, such as a slab or disk of quartz, will continue to oscillate when subjected to voltage at a frequency corresponding to its free vibration period. When utilizing a piezo electric element to predetermine the oscillation frequency of a circuit comprising an electron discharge device, oscillation is apparently started in the piezo electric crystal by the relatively small irregularities in the electron emission of the cathode of the device. These slight variations change the electrostatic stress applied to the piezo electric element and produce a train of compression and expansion waves throughout the piezo electric element at a frequency corresponding to its free vibration period. The comparatively feeble train of waves, by virtue of their mechanical effect upon the piezo electric element, cause an electromotive force of a frequency corresponding to the free vibration period of the piezo electric element to be applied to the grid of the electron discharge device, and this electromotive force functions to amplify the originally feeble electrostatic stresses applied to the piezo electric element to such an extent that they determine the oscillation frequency of the circuit. In utilizing piezo electric elements to predetermine the oscillation frequency of a circuit, however, difficulty is encountered in starting oscillation of the piezo electric element.

In accordance with my invention, this difficulty is avoided by initially adjusting the characteristics of the oscillation circuit so that it tends to operate at a frequency different from the resonance frequency of the piezo electric element.

My invention will be better understood from the following description when considered in connection with the accompanying drawings and its scope will be pointed out in the appended claims.

Figure 1:
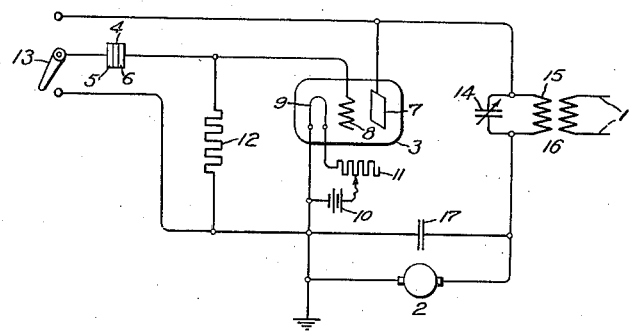
Figure 2:
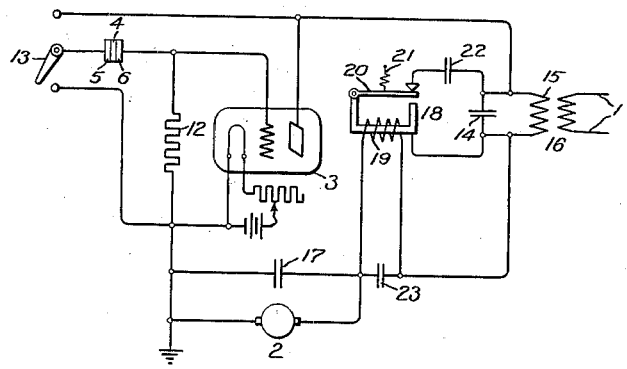

Referring to the drawings, Fig. 1 shows an oscillator arranged to be operated in accordance with my invention; and Fig. 2 shows an embodiment of my invention wherein means are provided for automatically changing the circuit connections to ensure starting of the oscillator.

Fig. 1 shows a circuit 1 which is connected to a direct current source 2 through a transformer 16 and an electrical valve 3 and which, during normal operation, is supplied with current at a frequency dependent on the free vibration period of a piezo electric element 4 interposed between electrodes 5 and 6. The valve 3 comprises an anode 7, a grid 8 and a cathode 9 connected to a source of heating current shown as a battery 10, through an adjustable resistor 11. A grid leak resistor is interposed between the cathode 9 and grid 8 which may be connected through the crystal 4 and a double throw switch 13 either to the anode 7 or to the cathode 9. A tuned circuit comprising an adjustable condenser 14 and the primary winding 15 of a transformer 16 is connected between the anode of the valve 3 and the generator 2 which is shunted by a condenser 17 to afford a path independent of the generator for the transmission of high frequency current.

In the operation of circuits similar to that described, it has been observed that the anode current of the valve 3 has its maximum value and the current of the tuned circuit comprising condenser 14 and coil 15 has its minimum value when the condenser is adjusted for a capacity much less than that corresponding to resonance; that the anode current of valve 3 remains practically constant and the current of the tuned circuit remains extremely small as the capacity of the condenser 14 is increased to a point where the piezo electric element starts to oscillate; that when the piezo electric element starts oscillating there is a large decrease in the anode current of the valve while the current of the tuned circuit remains far below its maximum value; that further increase in the capacity of the condenser 14 produces a relatively small decrease in the anode current of valve 3 and a marked increase in the current of the tuned circuit; and that still further change in the capacity of the condenser 14 produces a relatively rapid decrease in the current of the tuned circuit and eventually stops oscillation of the piezo electric element.

Assuming the double throw switch 13 to be in either of its closed positions and the condenser 14 to be adjusted to a capacity suitable for starting oscillation of the crystal, I have found that the circuit will start oscillating when a crystal of suitable dimensions is interposed therein as illustrated, and that a like result is produced when this crystal is replaced by other crystals having approximately the same dimensions. In every case, however, the condenser adjustment that starts oscillation of the crystal is not the one that gives the largest current in the tuned circuit comprising the condenser 14 and the winding. In the application of a piezo electric element to radio transmitting or receiving circuits, it is desirable that the condenser 14 be adjusted to produce stable and efficient operation of the tuned circuit. Such an adjustment permits the most effective inductive coupling with the next stage of amplification or produces the best condition for direct connection to the grid of the next stage through a suitable grid condenser and leak resistor.

In the use of crystal control circuits, it is advantageous to provide control apparatus that does not require careful tuning either to start oscillation of the crystal or to produce the most effective output. In the described embodiment of the invention this result may be produced by providing stops or notches by which the condenser 14 may be readily adjusted between positions adapted to start oscillation of the crystal and to secure the maximum output of the oscillator at which stable operation of the circuit is produced. It will be readily understood that this result may be produced also by like adjustment of a condenser connected in shunt to the condenser 14 or the coil 15 or by adjustment in the inductance coil 15.

In the use of oscillating circuits comprising a piezo electric element, continuity of service is of great importance. It has been found that oscillations of such a circuit may be stopped due to any combination of a number of disturbances such as cramping of the crystal due to change in level, a temporary excessive demand on the output of the oscillator circuit, interference of a nearby high-powered sending station, a temporary break in the wiring, or the like. Failure of the crystal to operate is likely to escape the notice of the operator where there is a great demand on his attention as in the manoeuvering of airplanes receiving signals from a ground station, for example. In order to secure continuity in the oscillation of the crystal, I propose to provide a control apparatus operable in accordance with the anode current of the valve for automatically tuning the circuit to start oscillation of the crystal and thereafter maintaining the output of the oscillation circuit at any desired value.

The value at which the oscillation circuit is maintained will be determined in each case by the result or electrical condition that it is desired to produce in the oscillation circuit. If it is desired to secure maximum output, the inductance or capacitance of the circuit will be adjusted between a value adapted to start oscillation of the piezo electric element and a value adapted to produce the highest output that can be produced without danger of instability in the operation of the circuit. If it is desired that the frequency of the oscillating circuit be maintained constant during the change in its connections, the inductance or capacity of the circuit will be adjusted between values adapted to compensate for the effect of change in the circuit connections on the oscillation frequency of the piezo electric element. In any case, the characteristics of the oscillating circuit are adjusted between values adapted to initiate oscillation of the piezo electric element and to maintain some other desired condition of operation.

Fig. 2 shows a relay 18 comprising a coil 19 connected in the anode circuit of the valve 3 and an armature 20 biased by a spring 21 to its upper position for connecting a condenser 22 to the coil 15 in parallel with the condenser 14. A condenser 23 is provided for shunting high frequency current past the relay coil.

With these connections the armature is operated to its lower position at starting due to the comparatively high value of the anode current of valve 3 and the oscillating circuit is tuned to a frequency somewhat higher than the resonant frequency of the piezo electric element 4. When the crystal starts oscillating, however, the anode current decreases to a value at which the armature 20 is moved to its upper position and the oscillating circuit is tuned for the desired output or other condition of operation. Should the piezo electric element stop oscillating, the anode current immediately increases in value and the process of tuning set forth above is repeated. Continuous oscillation of the circuit is thus assured under all conditions of operation.

In the case of the circuit illustrated by the drawing it has been found that, to ensure ready starting of the oscillations, the natural period of the oscillation circuit must be higher in frequency than the natural oscillating period of the piezo electric element and that after the piezo electric element starts to oscillate the desired output may be obtained by decreasing the free vibration period of the tuned circuit. Where a grid bias is used, this result may be produced under certain conditions by decreasing the free vibration period of the oscillation circuit to start oscillation of the piezo electric element. It will be apparent that the advantages of the invention are not limited to the particular circuits illustrated.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The method of operating an apparatus comprising a piezo electric element and a circuit connected thereto which comprises tuning said circuit to one frequency for initiating oscillation of said element, and tuning said circuit to another frequency for controlling an electrical condition of said circuit.

2. The method of operating an apparatus comprising a piezo electric element and a circuit connected thereto which comprises tuning said circuit to a frequency higher than the resonance frequency of said element for initiating oscillation of said element, and tuning said circuit to a lower frequency for controlling its output.

3. The method of operating an apparatus comprising a piezo electric element and a circuit including an electron discharge device provided with a grid connected to said element for controlling the transmission of current between its cathode and anode, which comprises tuning said circuit in response to current transmitted between said cathode and anode.

4. The method of operating an apparatus comprising a piezo electric element connected to a circuit, which comprises tuning said circuit in response to change in the condition of said element.

5. The combination of a circuit comprising current supply means, a piezo electric element connected to said circuit, and means operable in response to change in a condition of said element for tuning said circuit.

6. The combination of a circuit comprising current supply means, a piezo electric element connected to said circuit, and means operable to tune said circuit in response to oscillation of said element.

7. The combination of a piezo electric element, an electron discharge device comprising a grid connected to said element for controlling the transmission of current between the cathode and anode of said device, a circuit including current supply means connected between said cathode and anode, and means operable in response to current transmitted between said cathode and anode for tuning said circuit.

8. The combination of a piezo electric element, an electron discharge device comprising a grid connected to said element for controlling the transmission of current between the cathode and anode of said device, a circuit including current supply means connected between said cathode and anode, and a relay comprising an operating coil connected in the anode circuit of said device for tuning said circuit.

9. The combination of a piezo electric element, an electron discharge device comprising a grid connected to said element for controlling the transmission of current between the cathode and anode of said device, a circuit including current supply means connected between said cathode and anode, a relay comprising an operating coil connected in the anode circuit of said device for tuning said circuit, and means for shunting the high frequency current of said circuit past said coil and said current supply means.

In witness whereof, I have hereunto set my hand this second day of January, 1926.

ALVARADO L. R. ELLIS.